US009626778B2

(12) United States Patent
Stayman et al.

(10) Patent No.: US 9,626,778 B2
(45) Date of Patent: Apr. 18, 2017

(54) INFORMATION PROPAGATION IN PRIOR-IMAGE-BASED RECONSTRUCTION

(71) Applicant: The Johns Hopkins University, Baltimore, MD (US)

(72) Inventors: Joseph Webster Stayman, Baltimore, MD (US); Jeffrey H. Siewerdsen, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 31 days.

(21) Appl. No.: 14/404,889

(22) PCT Filed: May 31, 2013

(86) PCT No.: PCT/US2013/043781
§ 371 (c)(1),
(2) Date: Dec. 1, 2014

(87) PCT Pub. No.: WO2013/181635
PCT Pub. Date: Dec. 5, 2013

(65) Prior Publication Data
US 2015/0262390 A1  Sep. 17, 2015

Related U.S. Application Data

(60) Provisional application No. 61/654,574, filed on Jun. 1, 2012, provisional application No. 61/664,498, filed on Jun. 26, 2012.

(51) Int. Cl.
G06K 9/00 (2006.01)
G06T 11/00 (2006.01)
(52) U.S. Cl.
CPC ....... G06T 11/006 (2013.01); *G06T 2211/424* (2013.01)

(58) Field of Classification Search
CPC .................. G06T 2211/424; G06T 11/006
(Continued)

(56) References Cited

U.S. PATENT DOCUMENTS 8,355,557 B2 * 1/2013 Chen ..................... G06T 5/50
378/4
2009/0129700 A1  5/2009 Rother et al.
(Continued)

FOREIGN PATENT DOCUMENTS

KR  1020120003909  2/2015

OTHER PUBLICATIONS

G. H. Chen, et al., "Prior image constrained compressed sensing (PICCS): a method to accurately reconstruct dynamic CT images from highly undersampled projection data sets," Med Phys, vol. 35, pp. 660-663, Feb. 2008.
(Continued)

*Primary Examiner* — Gregory F Cunningham
(74) *Attorney, Agent, or Firm* — Johns Hopkins Technology Ventures

(57) ABSTRACT

A framework, comprising techniques, process(es), device(s), system(s), combinations thereof, or the like, to analyze propagation of information in prior-image-based reconstruction by decomposing the estimation into distinct components supported by a current data acquisition and by a prior image. Such decomposition can quantify contributions from prior data and current data as a spatial map and/or can trace specific features in an image to a source of at least some of such features.

16 Claims, 3 Drawing Sheets

(58) Field of Classification Search
USPC .......................................................... 382/131
See application file for complete search history.

(56) References Cited

U.S. PATENT DOCUMENTS

| 2009/0175523 A1 | 7/2009 | Chen et al. |
| 2010/0128958 A1 | 5/2010 | Chen et al. |
| 2011/0142314 A1 | 6/2011 | Hsieh et al. |
| 2012/0134550 A1 | 5/2012 | Knoplioch et al. |

OTHER PUBLICATIONS

Y. Ding, et al., "Incorporation of Noise and Prior Images in Penalized-Likelihood Reconstruction of Sparse Data," in SPIE Medical Imaging, San Diego, CA, 2012 (7 pages).

J. A. Fessler and W. L. Rogers, "Spatial resolution properties of penalized-likelihood image reconstruction: space-invariant tomographs," IEEE Trans Image Process, vol. 5, pp. 1346-1358, 1996.

K. Lange, "Convergence of EM image reconstruction algorithms with Gibbs smoothing," IEEE Trans Med Imaging, vol. 9, pp. 439-446, 1990.

K. Sauer and C. Bouman, "A Local Update Strategy for Iterative Reconstruction from Projections," IEEE Transactions on Signal Processing, vol. 41, pp. 534-548, Feb. 1993.

Stayman, J.W. et al—"Likelihood-based CT Reconstruction of Objects Containing Known Components," Int'l Mtg on Fully 3D Image Recon (Jul. 2011) (4 pages).

J. Stayman, et al., "Penalized-likelihood reconstruction for sparse data acquisitions with unregistered prior images and compressed sensing penalties," in SPIE Medical Imaging, 2011 (6 pages).

J. B. Thibault, et al., "A three-dimensional statistical approach to improved image quality for multi-slice helical CT," Med Phys, vol. 34, pp. 4526-4544, Nov. 2007.

* cited by examiner

INFORMATION PROPAGATION IN PRIOR-IMAGE-BASED RECONSTRUCTION

CROSS REFERENCE TO RELATED PATENT APPLICATIONS

This application claims the benefit of priority under 35 U.S.C. §371 of International Application PCT/US2013/043781, filed on May 31, 2013, which claims the benefit of priority of U.S. Provisional Patent Application No. 61/654,574, filed Jun. 1, 2012, and U.S. Provisional Patent Application No. 61/664,498, filed Jun. 26, 2012. The contents of the prior international and provisional applications are hereby incorporated by reference herein in their entirety.

STATEMENT REGARDING FEDERALLY SPONSORED RESEARCH

This invention was made with government support under contract 2R01-CA-112163 and CA127444 awarded by the National Institutes of Health (NIH). The government has certain rights in the invention.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Advanced reconstruction methods for computed tomography include sophisticated forward models of the imaging system that can capture the pertinent physical processes affecting the signal and noise in projection measurements. However, most such methods generally marginally integrate prior knowledge of a subject, often relying primarily or exclusively on very general notions of local smoothness or edges. In many scenarios, such as in longitudinal surveillance or interventional imaging, the subject (or patient) has undergone a sequence of studies prior to the current image acquisition, wherein such studies can comprise a wealth of prior information associated with patient-specific anatomy. While traditional techniques typically tend to treat each data acquisition as an isolated event and generally disregard such valuable patient-specific prior information, some reconstruction methods, such as PICCS (see, e.g., G. H. Chen, et al., "Prior image constrained compressed sensing (PICCS): a method to accurately reconstruct dynamic CT images from highly undersampled projection data sets," *Med Phys, vol.* 35, pp. 660-3, February 2008) and PI-PLE (see, e.g., J. Stayman, et al., "Penalized-likelihood reconstruction for sparse data acquisitions with unregistered prior images and compressed sensing penalties," in *SPIE Medical Imaging*, 2011), can incorporate prior images into a reconstruction objective function. In one aspect, inclusion of such information can permit substantive reduction in the data fidelity requirements and, in another aspect, more robustly can accommodate substantial undersampling and/or exposure reduction with ensuing benefits to imaging speed and/or reduced radiation dose. While such prior-image-based methods can offer tremendous promise, the introduction of prior information in the reconstruction can raise significant concern regarding the accurate representation of features in an image and whether such features arise from current data acquisition or from prior image(s).

The disclosure provides a useful, novel and non-obvious framework (techniques, process(es), device(s), system(s), combinations thereof, or the like) to analyze propagation of information in prior-image-based reconstruction by decomposing the estimation into distinct components supported by a current data acquisition and by a prior image. Such decomposition can quantify contributions from prior data and current data as a spatial map and/or can trace specific features in an image to a source of at least some of such features. In one aspect, the spatial map can be referred to as an "information source map" and may be used, in certain embodiments, as a measure of confidence that a certain image feature arises from the current data or from the prior data, and to more quantitatively guide selection of parameter value(s) that can affect the strength of prior information in the resulting current image.

The system(s), device(s), and methods of the disclosure can comprise use of the disclosure and embodiments thereof in collecting, reviewing, manipulating and/or evaluating data from computed tomography (e.g., CT scans), continuous therapy modalities, including but not limited to lung node surveillance, image-guided surgeries or other clinical procedures, and/or radiation therapy.

In addition or in the alternative, the disclosure permits development (e.g., design, manufacturing, and/or control) of any tomographic imaging system including prior-image-based reconstruction methods. In one aspect, some methods of the disclosure can analyze the contribution of prior image data (or prior imaging data) to a resulting image reconstruction (or reconstruction), thus the disclosure can be directed to or implemented (e.g., utilized) in products (such as systems, devices, apparatuses, and the like) that can analyze changes in patient anatomy between a prior image and a current image. For example, the disclosure can be utilized in guiding interventional procedures.

Additional aspects, features, or advantages of the subject disclosure will be set forth in part in the description which follows, and in part will be obvious from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The accompanying drawings are incorporated and illustrate exemplary embodiment(s) of the subject disclosure and together with the description and claims appended hereto serve to explain various principles, features, or aspects of the subject disclosure.

DETAILED DESCRIPTION

Figure 1:
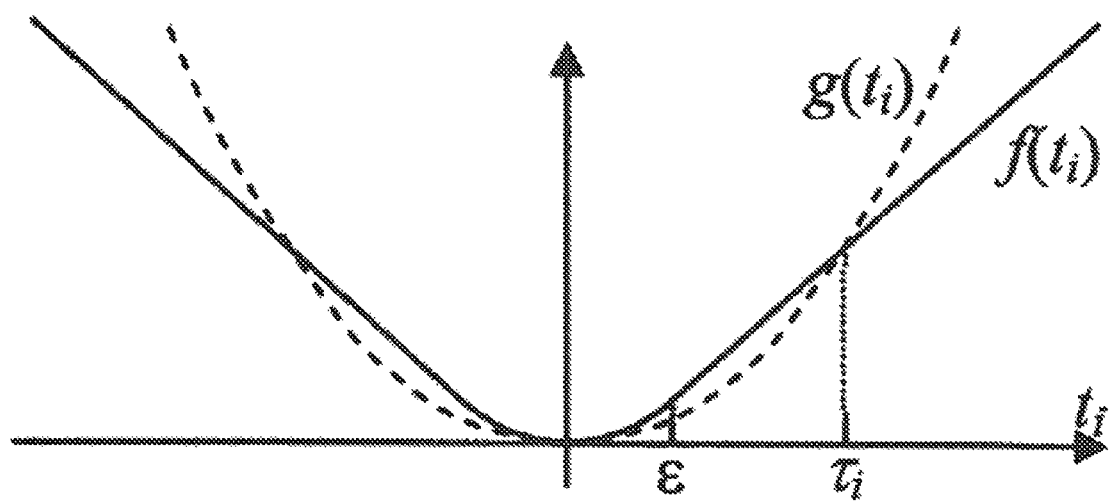
FIG. 1: Scenario in which a prior image reconstruction that uses the modified norm that includes $f(t_i)$. Finding a suitable operating point, $\tau_i$, $f(t_i)$ can be approximated with a quadratic function, $g(t_i)$, that intersects at $f(\tau_i)$.

The subject disclosure may be understood more readily by reference to the following detailed description of exemplary embodiments of the subject disclosure and to the Figures and their previous and following description.

Before the present articles, devices, and/or methods are disclosed and described, it is to be understood that the subject disclosure is not limited to specific systems and methods for analysis of propagation of prior-image-based reconstruction. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the subject specification and in the claims which follow, reference may be made to a number of terms which shall be defined to have the following meanings: "Optional" or "optionally" means that the subsequently described event or circumstance may or may not occur, and that the description includes instances where said event or circumstance occurs and instances where it does not.

As employed in this specification and annexed drawings, the terms "unit," "component," "interface," "system," "platform," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. In addition or in the alternative, a unit can provide specific functionality based on physical structure or specific arrangement of hardware elements. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing example and related illustrations are but a few examples and are not intended to be limiting. Moreover, while such illustrations are presented for a unit, the foregoing examples also apply to a component, a system, a platform, and the like. It is noted that in certain embodiments, or in connection with certain aspects or features thereof, the terms "unit," "component," "system," "interface," "platform" can be utilized interchangeably.

Throughout the description and claims of this specification, the words "comprise," "include," and "having" and their variations, such as "comprising" and "comprises," "include" and "including," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Disclosed are components that can be utilized to perform the disclosed methods, devices, and/or systems. These and other components are disclosed herein, and it is understood that when combinations, subsets, interactions, groups, etc. of these components are disclosed that while specific reference of each various individual and collective combinations and permutation(s) of these may not be explicitly disclosed, each is specifically contemplated and described herein, for all methods, devices, and/or systems. This applies to all aspects of the subject disclosure including steps, or actions, in the disclosed method(s). Thus, if there are a variety of additional steps, or actions, that can be performed, then it is understood that each of such additional steps, or actions, can be performed with any specific embodiment or combination of embodiments of the disclosed methods.

As will be readily appreciated, in one aspect, the methods, devices, and/or systems of the disclosure can take the form of an entirely hardware embodiment, an entirely software embodiment, or an embodiment combining software and hardware aspects. In an additional or alternative aspect, the methods, devices, and/or systems can take the form of a computer program product on a computer-readable storage medium having computer-readable program instructions (e.g., computer software) embodied in the storage medium. More particularly, the disclosed methods, devices, and/or systems can take the form of web-implemented computer software. Any suitable computer-readable storage medium can be utilized including hard disks, CD-ROMs, optical storage devices, or magnetic storage devices.

The disclosure provides a new analytical framework for prior image reconstruction. This allows for quantification of the information source spatially in a volume, and it is demonstrated using prior image penalized likelihood estimation (PI-PLE) and prior image constrained compressed sensing (PICCS). The disclosure identifies and addresses several issues in prior image reconstitution including, but not limited to, dealing with regions where no change can be visualized, regions where there is possibly change, and features of relationships between prior strength and information content including shift-variance. Multiple alternative aspects of the disclosure detail absolute penalty strength selection, approaches that avoid reconstitution, methodologies that comprise three information sources (i.e. projection data, prior images, and roughness penalty), and various presentation formats to convey information sources.

Embodiments of the methods and systems are described below with reference to block diagrams and flowchart and/or call-flow illustrations of methods, systems, apparatuses and computer program products. It will be understood that each block of the block diagrams and flowchart illustrations, and combinations of blocks in the block diagrams and flowchart illustrations, respectively, can be implemented by computer program instructions. Such computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions also can be loaded onto a computer or other programmable data processing apparatus to cause a series of operational steps, or acts, to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It also will be understood that each block of the block diagrams and flowchart illustrations, and combinations of blocks in the block diagrams and flowchart illustrations, can be implemented by special purpose hardware-based computer systems that can perform the specified functions or steps, or combinations of special purpose hardware and computer instructions.

Reference will now be made in detail to the various embodiment(s), aspects, and features of the subject disclosure, example(s) of which are illustrated in the accompanying drawings. Wherever possible, the same reference numbers are used throughout the drawings to refer to the same or like parts.

I. Introduction

Significant effort on the development of advanced tomographic reconstruction approaches has focused on increasingly sophisticated and accurate models for the data acquisition and noise associated with the measurements. Statistical methods using such advanced forward models have demonstrated a substantially improved tradeoff between radiation dose and image quality, and such model-based techniques are being adopted for more widespread use in clinical diagnostic imaging. Despite such advances, most approaches typically use little prior information about the anatomical structure of the patient. Typical model-based approaches primarily utilize general concepts including image smoothness or edges to encourage desirable image features.

In many scenarios, a significant amount of knowledge about the object can be available. Consider the case of interventional imaging. Prior to an image-guided intervention, a patient typically has one or more imaging studies conducted for purposes of diagnosis and treatment planning. Other sequential imaging situations include longitudinal surveillance of disease progression or therapy response. Traditionally, imaging systems treat each acquisition in isolation even though previous scans can contain a wealth of patient-specific prior information.

While such knowledge is typically ignored (even in model-based reconstructors, for example), two example methods that integrate prior images include PICCS and PI-PLE. Both such methods utilize compressive sensing notions and prior images to construct a sparse domain and apply sparsity encouraging metrics (e.g., the $l_1$ norm). The methods differ in that PICCS does not include a noise model and relies on a linear constraint related to the data (requiring a linearizable forward model, for example), whereas PI-PLE uses a likelihood-based objective and forward model similar to other statistical, model-based methods. Both methods can provide good image quality even under conditions of substantive data undersampling, and PI-PLE may be suitable under conditions of simultaneous undersampling and photon starvation.

The disclosure recognizes and addresses, in one aspect, the issue of quantification of the extent to which the features in an image are the result of newly acquired data, and to what extent such features are the result of a prior image. For example, if a prior image is included in the reconstruction process, it is contemplated that the disclosed systems and methods can be used to determine if a reconstructed feature is "real"—e.g., the feature is an actual characteristic of the imaged tissue or object—and supported by the current data collection, as opposed to a feature that appears in a current image because the feature was present in a prior image. In addition or in the alternative, the disclosure recognizes and addresses, in another aspect, the issue of configuration, or selection, of parameters that can adjust the strength of prior images, allowing image features to be selectively eliminated or reinforced in a resulting image.

In one aspect, the disclosure relates to a novel framework (techniques, process(es), device(s), system(s), combinations thereof, or the like) that can track propagation of information from both the current measurement data and from prior image portions of the reconstruction objective function. In one aspect, without wishing to be bound by theory, simulation, and/or modeling, the disclosed systems and methods can leverage the mathematical form of objective functions available to conventional prior-image-based reconstructions methods (such as PI-PLE or PICCS), thereby yielding novel and non-obvious objective functions in accordance with one or more aspects disclosed herein. In one aspect, the disclosure is distinct and provides an example methodology by which the contribution of prior data and current data can be estimated for each image voxel.

II. Example Methods

Illustrative General Aspects of Prior-Image Reconstruction Methods

In one aspect, the disclosure incorporates the following forward model where the mean transmission measurements can be written as $$\bar{y}=D\{b\}\exp(-A\mu)+r \qquad (1)$$

where D represents an operator that forms a diagonal matrix from a vector; b is a vector comprising detector pixel-dependent photon levels and detector sensitivity effects; µ is a vector of the discretized attenuation volume that is desired to be estimated; r is a vector of the scatter contribution (r is presumed known); and A represents the so-called system matrix that can carry out the projection operation. It should be appreciated that $A^T$ represents the matched back projection operation. In another exemplary aspect, a forward model can be described by a matrix-vector notation, written as $$\bar{y}(\mu)=D\{b\}\exp(-l)+r, \ l=A\Delta \qquad (2)$$

where $\bar{y}$ (µ) represents mean projection data, b represents system gain, −l and l are line integrals, A is a system matrix (projector), and µ is a vector of the discretized attenuation volume that is desired to be estimated.

From such a forward model, in one aspect, a noise model can be incorporated and a likelihood-based objective function can be derived to estimate the attenuation volume. In one implementation, selection of a Poisson noise model can yield the following log-likelihood function $$L(\mu; y) = \sum_i h_i([A\mu]_i) \quad (3)$$

$$h_i(l_i) = y_i \log(b_i e^{-l_i} + r_i) - (b_i e^{-l_i} + r_i)$$

where $h_i$ is the marginal log-likelihood for the $i^{th}$ measurement, and y represents data. In one aspect, without wishing to be bound by theory, simulation, and/or modeling, an objective function (or estimator) in accordance with one or more aspects of the disclosure can have the following mathematical form:

$$\hat{\mu} = \arg\max L(\mu;y) - \beta_R \|\Psi_R\mu\|^{P_R} - \beta_P \|\Psi_P(\mu-\mu_P)\|^{P_P} \quad (4)$$

It can be appreciated that the estimator (or objective function) in Eq. (4) comprises three terms: (1) The first term is a log-likelihood function that can enforce a fit between an attenuation estimate and the data, and that incorporates the relative data fidelity of different measurements. (2) The second term is a generalized image penalty that can discourage roughness in the reconstruction through the use of a gradient (or, in certain implementations, other sparsifying) operator $\Psi_R$ applied to an image volume and a p-norm metric. (3) The third term can encourage similarity with a previously obtained prior image, $\mu_P$ and also may use, in one aspect, a sparsifying operator $\Psi_P$. In certain embodiments, different sparsifiers and p-norms can be allowed for each of the two penalty terms (as indicated by subscripts), and the relative strength of the roughness and prior-image penalties can be controlled, respectively, by the regularization parameters $\beta_R$ and $\beta_P$. The implicit estimator described by (4) may not have a closed-form solution, and solutions can be obtained iteratively. In another aspect, the general form for prior image reconstitution can be shown as follows:

$$\hat{\mu} = \arg\max \Sigma_i h_i([A\mu]_i) - \beta_P \|\Psi(\mu-\mu_P)\|^P - \beta_R \|\Psi\mu\|^P \quad (5)$$

where $$\beta_P = \frac{\alpha}{\beta} \text{ and } \beta_R = \frac{(1-\alpha)}{\beta} \cdot \Sigma_i h_i([A\mu]_i)$$

is the data fit term, $\beta_P \|\Psi(\mu-\mu_P)\|^P$ is the prior image penalty term, and $\beta_R \|\Psi\mu\|^P$ is the roughness penalty term.

The conventional PICCS methodology is another approach that can leverage information from prior images. The general form of the conventional PICCS objective function and constraint can be cast as:

$$\hat{\mu} = \arg\min \Omega(\mu) \text{ s.t. } A\mu = \hat{l}(y) \quad$$

$$\Omega(\mu) = \alpha \|\Psi_P(\mu-\mu_P)\|^P + (1-\alpha)\|\Psi_R\mu\|^P. \quad (6)$$

Here, the objective function comprises terms that are analogous to the prior image penalty and general image penalty terms in (4) with a control parameter a, but the data enters through a linear constraint based on an estimate of the line integrals. In one aspect, solutions can be computed iteratively. In another aspect, PICCS can be characterized by the following mathematical form:

$$h_i(l_i) = -\|l_i - \hat{l}(y)\|_W^2 \quad (7)$$

$$\hat{\mu}_{PICCS} = \arg\min \alpha \|\Psi(\mu-\mu_P)\|^P + (1-\alpha)\|\Psi_\mu\|^P \text{ s.t. } A\mu = \hat{l}(y), \quad (8)$$

where:

$$W = I$$

$$\beta_P = \frac{\alpha}{\beta}$$

$$\beta_R = \frac{(1-\alpha)}{\beta},$$

and where the same constraints as in (6) are applicable. The following equations ((9)-(11)) can be used to further describe the relationship between PICCS and PI-PLE. It is contemplated that the unconstrained forms represented by equations (9)-(11) can be substantially equivalent to PICCS.

$$\hat{\mu} = \arg\max - \|A\mu - \hat{l}\|_W^2 - \beta_P \|\Psi_P(\mu-\mu_P)\|^P - \beta_R \|\Psi_R\mu\|^P \quad (9)$$

$$\hat{\mu} = \arg\min\left[\|A\mu - \hat{l}\|^2 + \frac{\alpha}{\beta}\|\Psi_P(\mu-\mu_P)\|^P + \frac{(1-\alpha)}{\beta}\|\Psi_R\mu\|^P\right] \quad (10)$$

$$\hat{\mu} = \arg\min\left[\lim_{\beta \to \infty}\left\{\|A\mu - \hat{l}\|^2 + \frac{\alpha}{\beta}\|\Psi_P(\mu-\mu_P)\|^P + \frac{(1-\alpha)}{\beta}\|\Psi_R\mu\|^P\right\}\right] \quad (11)$$

For a particular noise model (i.e., a Poisson noise model), the function $h_i(l_i)$ can be provided as:

$$h_i(l_1) = y_i \log(b_i e^{-l_i + r_i}) - (b_i e^{-l_i + r_i}) \quad (12)$$

Thus, it is contemplated that different noise models can yield different $h_i(l_i)$ functions.

It is contemplated that the relationship between PICCS and PI-PLE can be elucidated somewhat by rewriting the PICCS estimator in an unconstrained form as:

$$\hat{\mu} = \arg\min \Theta(\mu) \quad (13)$$

$$\Theta(\mu) = \lim_{\beta \to \infty} \{\alpha \|\Psi_P(\mu-\mu_P)\|^P + (1-\alpha)\|\Psi_R\mu\|^P + \beta \|A\mu - \hat{l}\|^2\}$$

$$= \lim_{\beta \to \infty}\left\{\|A\mu - \hat{l}\|^2 + \frac{(1-\alpha)}{\beta}\|\Psi_R\mu\|^P + \frac{\alpha}{\beta}\|\Psi_P(\mu-\mu_P)\|^P\right\}.$$

Therefore, PICCS and PI-PLE can be similar, but the latter can utilize an unweighted norm for the data fit term and regularization parameters $\beta_R = (1-\alpha)/\beta$ and $\beta_P = \alpha/\beta$, with large β values.

Analysis of Prior-Image-Based Reconstruction

Direct analysis of (4) can be difficult due to the nonlinearities of the likelihood function and the use of p-norms. One exemplary approximation that can be applied is to use a second-order Taylor approximation of the likelihood about an estimate of the line integrals, so that the objective may be re-written approximately as $$\hat{\mu} \approx \arg\min \|A\mu - \hat{l}\|_W^2 + \beta_R \|\Psi_R\mu\|^{P_R} + \beta_P \|\Psi_P(\mu-\mu_P)\|^{P_P} \quad (14)$$

where a weighted norm is adopted for the first term and $$W = D\left\{\frac{(y-r)^2}{y}\right\} \quad \hat{l}_i(y) = -\ln\left(\frac{y_i - r_i}{b_i}\right). \quad (15)$$

In an exemplary embodiment in which penalties are quadratic ($p_R=2$ and $p_P=2$) the following closed-form can be obtained:

$$\hat{\mu} \approx \operatorname{argmin} \|A\mu - \hat{l}\|_W^2 - \beta_R \|\Psi_R \mu\|^2 - \beta_P \|\Psi_P(\mu - \mu_P)\|^2 = \quad (16)$$
$$(A^T W A + \beta_R \Psi_R^T \Psi_R + \beta_P \Psi_P^T \Psi_P)^{-1}(A^T W \hat{l} + \beta_2 \Psi_P^T \Psi_P \mu_P).$$

Equation (16) can be decomposed as follows:

$$\hat{\mu}_D = F(y) + G(\mu_P) \quad (17)$$

$$F(Y) = (A^T W A + \beta_R \Psi_R^T \Psi_R + \beta_P \Psi_P^T \Psi_P)^{-1} A^T W \hat{l}(y)$$

$$G(\mu_P) = (A^T W A + \beta_R \Psi_R^T \Psi_R + \beta_P \Psi_P^T \Psi_P)^{-1} \beta_P \Psi_P^T \Psi_P \mu_P. \quad (18)$$

In one aspect, the first term, $F(y)$, is a function of at least the current data and, in another aspect, the second term, $G(\mu_P)$, is a function of at least the prior image. It is contemplated that such an additive form can provide two distinct attenuation domain volumes having respective sources that can be traced to either the current data or the prior image. It is further contemplated that analysis of such volumes can reflect how information is transferred from the two sources to a resulting image. It is still further contemplated that the extent to which specific image features arise from a specific information source can be identified in a spatially varying manner—an information source map. In operation, it is contemplated that there can be differentiation between the approximate "decomposition" reconstruction, $\hat{\mu}_D$, and the solution to (14), $\hat{\mu}$. However, with valid approximations, it is expected that such terms can be nearly identical.

It should be appreciated that while the selection of quadratic penalty (p=2) terms in (14) allows for the simple decomposition in (18), reconstructions with quadratic penalties can provide, in certain scenarios, a fairly poor integration of prior image information. In particular, one aspect of certain conventional approaches, such as PI-PLE and PICCS approaches, is the use of lower p-values that can encourage similarity to a prior image, but include a small enough penalty for larger differences that significant changes still can be permitted in the reconstruction. Generally, it is contemplated that improved results can be achieved when p is less than 2. In various applications, the p-value can be 1; it is contemplated that this p-value can allow for sparse differences between a prior image and a current image. The following section illustrates an example decomposition methodology for accommodating nonquadratic penalties in accordance with one or more aspects of the disclosure.

Example Approximation for Nonquadratic Penalties

In one scenario the typical selection of p=1 can be difficult for some reconstruction algorithms and thus can be replaced by a modified norm that is "rounded" near the origin and differentiable at zero. For example, $$\|t\|^1 \approx \sum_i f(t_i) \quad f(t_i) = \begin{cases} \frac{1}{2\varepsilon} t_i^2 & |t_i| < \varepsilon \\ \left|t_i - \frac{\varepsilon}{2}\right| & |t_i| \geq \varepsilon \end{cases} \quad (19)$$

For very small $\varepsilon$, it is contemplated that (19) can be substantially equivalent to the p=1 penalty. As illustrated in FIG. 1, given a suitable operating point, $\tau$, the modified norm can be approximated using a quadratic function $$g(t_i) = \kappa_i(\tau_i) t_i^2 \quad \kappa_i(\tau_i) = \begin{cases} \frac{1}{2\varepsilon} & |\tau_i| < \varepsilon \\ \frac{\left|\tau_i - \frac{\varepsilon}{2}\right|}{\tau_i^2} & |\tau_i| \geq \varepsilon \end{cases} \quad (20)$$

such that $$\|t\|^1 \approx \sum_i g(t_i) = (t)^T D\{\kappa(\tau)\}(t) \quad (21)$$
$$= \|t\|_{D\{\kappa(\tau)\}}^2.$$

Pursuant to (19) and (20), it is contemplated that if the appearance of a reconstruction is known, then the p=1 penalty can be approximated with an equivalent quadratic (p=2) penalty. Equation (21) is a mathematical representation of the quadratic (p=2) penalty, reflecting the weighting set forth in (20). Thus, it is contemplated that information obtained from equations (1)-(18) can be used to determine the penalty in accordance with equations (19)-(21). Moreover, it is contemplated that information that conventionally has not been useful for the quadratic (p=2) penalty can be used in accordance with equations (19)-(21).

Applying the approximation (21) to (14) for the case of $p_R=1$ and $p_P=1$ can yield an approximate decomposition according to (27), set forth below.

$$\hat{\mu} = \operatorname{argmax} \sum_i h_i([A\mu]_i) - \beta_P \|\Psi(\mu - \mu_P)\|^1 - \beta_R \|\Psi_\mu\|^1 \quad (22)$$

$$\approx \operatorname{argmin} \|A\mu - \hat{l}\|_W^2 + \beta_P \|\Psi_P(\mu - \mu_P)\|^1 + \beta_R \|\Psi_R \mu\|^1 \quad (23)$$

$$\approx \operatorname{argmin} \|A\mu - \hat{l}\|_W^2 + \beta_P \|\Psi_P(\mu - \mu_P)\|_{D_P}^2 + \beta_R \|\Psi_R \mu\|_{D_R}^2 \quad (24)$$

$$D_R = D\{\kappa(\Psi_R \hat{\mu})\} \quad (25)$$
$$D_P = D\{\kappa(\Psi_P(\hat{\mu} - \mu_P))\}.$$

$$\hat{\mu}_{PIPLE} \approx \hat{\mu}_D = F(y) + G(\mu_P) \quad (26)$$

In one aspect, an operating point for the approximation can be selected. In the analysis described herein, it is considered that the reconstruction in (4) is already available, thus permitting selection of an operating point based on the solution $\hat{\mu}$. Accordingly, in one aspect, the diagonal matrices in (27) can be defined according to (25). It is contemplated that (18) and (27) can be closely related and can be substantially equal if the diagonal matrices in (25) are identical.

In another aspect, the methodology and mathematical processes disclosed herein can be extended to other p-values. Thus, it is contemplated that operating points can be selected for p-values other than one. It is further contemplated that a quadratic approximation can be found for such p-values.

In an exemplary aspect, the disclosed decomposition can be applied to PICCS by leveraging, in one aspect, the unconstrained form in (12). In such scenarios, it is contemplated that the parameter $W=I$ and a sufficiently large $\beta$ can be adopted.

In one aspect, since the system matrix is typically not computed explicitly and can be too large to store, a conjugate gradient approach can be utilized for approximating the terms $F(y)$ and $G(\mu_P)$ in (27) to decompose a prior-imagebased reconstruction (e.g., PI-PLE or PICCS, or the like) into data-supported and prior-image-supported components. Thus, it is contemplated that a decomposition/information source map (ISM) can be built from the F(y) and G($\mu_P$) values that can be used with a quadratic (p=2) penalty. Because of the approximation set forth in (21) and depicted graphically in FIG. 1, it is further contemplated that the decomposition/information source map (ISM) of F(y) and G($\mu_P$) values can also be used with a p=1 penalty.

Shift-invariant penalties are commonly applied in penalized-likelihood reconstructions; however, due to the statistical weighting of the objective function, application of these penalties conventionally results in shift-variant image properties. These shift-variant properties can manifest themselves in PI-PLE in the following fashion. Consider a simple object with a low attenuation area and a high attenuation area. Furthermore, consider there is a prior image of the simple object that will be used for a PI-PLE reconstruction but the current data to be reconstructed has two small changes of equal contrast in the two attenuation areas (high and low). It is contemplated that even though the changes are of equal contrast, the changes will not be reconstructed equally for a shift-variant application (application of the same penalty throughout the entire image) of the penalty function. For example, for some regularization strengths ($\beta_P$), it is contemplated that the change will be apparent in the low intensity area but not in the high intensity area.

In exemplary applications, it is contemplated that the form of the decomposition derived above for information source mapping can also be used to correct for this non-uniform "admittance of change." That is, using the approximation in (21), it is contemplated that an intentional shift-variant penalty can attempt to correct for non-uniform change admittance. It if further contemplated that the reconstruction can be altered to use penalties that have a space-variant weighting, $D_c$, with the reconstruction being written as:

$$\beta = \arg\max \Sigma_i h_i([A\mu]_i) - \beta_P \|\Psi(\mu - \mu_P)\|_{D_c}^1 - \beta_R \|\Psi\mu\|_{D_c}^1 \quad (28)$$

and, following application of the analysis set forth herein, the approximation can be written as:

$$\hat{\mu} = (A^T W A + \beta_R \Psi_R^T D_C D_R \Psi_R + \beta_P \Psi_P^T D_C D_P \Psi_P)^{-1} \cdot (A^T W \hat{l}(y) + \beta_P \Psi_P^T D_C D_P \Psi_P \mu_P) \quad (29)$$

In exemplary aspects, it is contemplated that interior diagonal weights can be approximated by exterior diagonal weighting. An exemplary technique for approximating interior diagonal weights is described in J. A. Fessler and W. L. Rogers, "Spatial resolution properties of penalized-likelihood image reconstruction: space-invariant tomographs," *IEEE Trans Image Process*, vol. 5, pp. 1346-58, 1996. By using exterior diagonal weighting to approximate the interior diagonal weights, it is contemplated that the "natural" shift-variance of the PI-PLE estimation for a geometrically shift-invariant system can be countered by selecting $$D_C = D\{c_j\} \quad c_j = \Sigma_i \alpha_{ij}^2 y_i / \Sigma_i \alpha_{ij}^2 \quad (30)$$

It is contemplated that application of these shift-variant weights can allow for uniform change admittance. For example, it is contemplated that application of the shift-variant weights to the two-change example discussed above can cause both changes to appear substantially uniformly over a sweep of the prior image regularization parameter strength ($\beta_P$). It is further contemplated that similar control of admittance can be derived for systems that are not geometrically shift-variant.

Illustrative Results and Discussion

To investigate the data and prior image decomposition framework described herein, the imaging scenario described below can be adopted. In one experiment, a prior image and a true follow-up image were used to form current acquisition data (e.g., ROI or angularly undersampled). The images were substantially the same except for the addition of a simulated lung nodule in the follow-up image. In one aspect, the experiment presumed the availability of a reconstructed prior image and data for a follow-up image that included a change (e.g., enlargement of a nodule feature in the right lung). The follow-up acquisition comprised, in one aspect, highly sparse data. Two acquisition strategies using a simulated C-arm geometry were investigated: (1) a region-of-interest (ROI) scan that can acquire 60 laterally truncated projections over 360°; and (2) an angularly subsampled scan that can acquire 20 untruncated projections over 360°. In one aspect, all experiments utilized 0.776 mm detector pixels, 0.8 mm isotropic voxels, and a monoenergetic x-ray beam with $10^5$ photons per detector element in the unattenuated beam. Both PI-PLE and PICCS reconstructions were investigated. However, other measurement configurations (e.g., other sources of radiation) are also contemplated.

The decomposition approach described herein was applied to the ROI acquisition experiment. In one aspect, a PI-PLE reconstruction was formed (for example, using $P_R=2$ and $p_P=1$), and both the data-based (F(y)) and the prior-image-based (G(y)) terms of the decomposition, along with the predicted reconstruction, $\hat{\mu}_D$, were illustrated. In one aspect, the sum of the individual terms can represent a measure of the validity of the approximations leading to (17); e.g., $\hat{\mu} \approx \hat{\mu}_D$, which was qualitatively confirmed by the results. A colorized information source map identified regions of the estimate that arose predominantly from either the current data or the prior image. In one aspect, in this ROI scenario, increasing contribution from the prior image was observed in regions outside the scanned ROI. In another aspect, the anatomical change (e.g., the simulated lung nodule) occurring between the prior image and follow-up image was clearly traced to the F(y) term representing the newly acquired data.

It is contemplated that the use of information source mapping for region of interest reconstruction can allow for the use of truncated or sparse data. The disclosed technique can allow for identification of source contribution following PI-PLE reconstitution and source decomposition. Through decomposition of source data provided by a function of at least the current anatomy image and a function of at least a prior image, a predicted reconstitution can be produced. An information source map can incorporate the relative contributions of the source data and identify the respective contributions within the image. When using a PI-PLE reconstruction model, it is contemplated that varying $\beta_P$ values can alter the contribution of the prior image, and alterations in $\beta_P$ can be readily apparent in an information source map. Similarly, when PICCS reconstruction is utilized, it is contemplated that the choice of $\alpha$ can impact source contribution, with a larger $\alpha$ yielding increased reliance on the prior image and a smaller a yielding increased reliance on the roughness penalty. As in the case of PI-PLE, it is contemplated that alterations in $\alpha$ can be readily apparent in an information source map.

A second experiment contemplated the angularly undersampled case in which reconstructions were performed using both PI-PLE (e.g., an approach having $P_R=2$, $p_P=1$) and PICCS (e.g., an approach having p=1) over a range of reconstruction parameters. Specifically, yet not exclusively, a sweep over the prior image penalty strength ($\beta_P$) for PI-PLE and a sweep of the α parameter in PICCS can be performed. The results of the sweep over $\beta_P$ and the sweep over α were separately determined. Information source mapping was applied to angularly undersampled data using PI-PLE. Each row of the information source map represented a different prior image penalty strength ($\beta_P$). The direct relationship between prior image penalty strength and the influence of the prior image was apparent. Low $\beta_P$ values resulted in a negligible G component and produced images similar to traditional penalized-likelihood with no prior image contribution. High $\beta_P$ values yielded greater similarity with the prior image, and the changes supported by the newly acquired data were readily apparent in the F(y) component and the colorized source maps—prominently, the solitary lung nodule. Additionally, information source mapping was applied to the angular undersampling case and PICCS reconstruction. Each row of the information source map represented a different choice of α, with a larger α yielding increased reliance on the prior image and a small α yielding increased reliance on the roughness penalty.

In one aspect, in both cases, the relationship between parameter strength and the strength of the prior image was readily reflected in the decomposition. In another aspect, the presence of the lung nodule was consistently represented in the data decomposition term, F(y). In one aspect, similar image reconstructions did not necessarily have similar decompositions. Such aspects were readily apparent in the reconstructions at higher levels of $\beta_P$ and α, and suggested that even though the images appeared to be very similar, the images were actually relying on different sources of information transferred from the prior data and newly acquired data. Accordingly, it is contemplated that the methodology disclosed herein can permit drawing different conclusions regarding what might have changed in an image, and what image features can be supported by the data.

In one aspect, the disclosed methods provide the ability to trace the source of information and thus permit understanding of how information propagates in prior-image-based reconstruction and how data and prior information are integrated in a resulting image. In another aspect, the disclosure can provide a quantitative methodology, and related system(s), that can permit justifying the selection of penalty strengths. In yet another aspect, the disclosure can provide a basis or approach to design penalties that enforce a specific balance of information usage.

The framework described herein can permit illustrating relationship(s) between methods such as PICCS and PI-PLE, and the particular information balance that is reached by either one of such methods.

Figure 2:
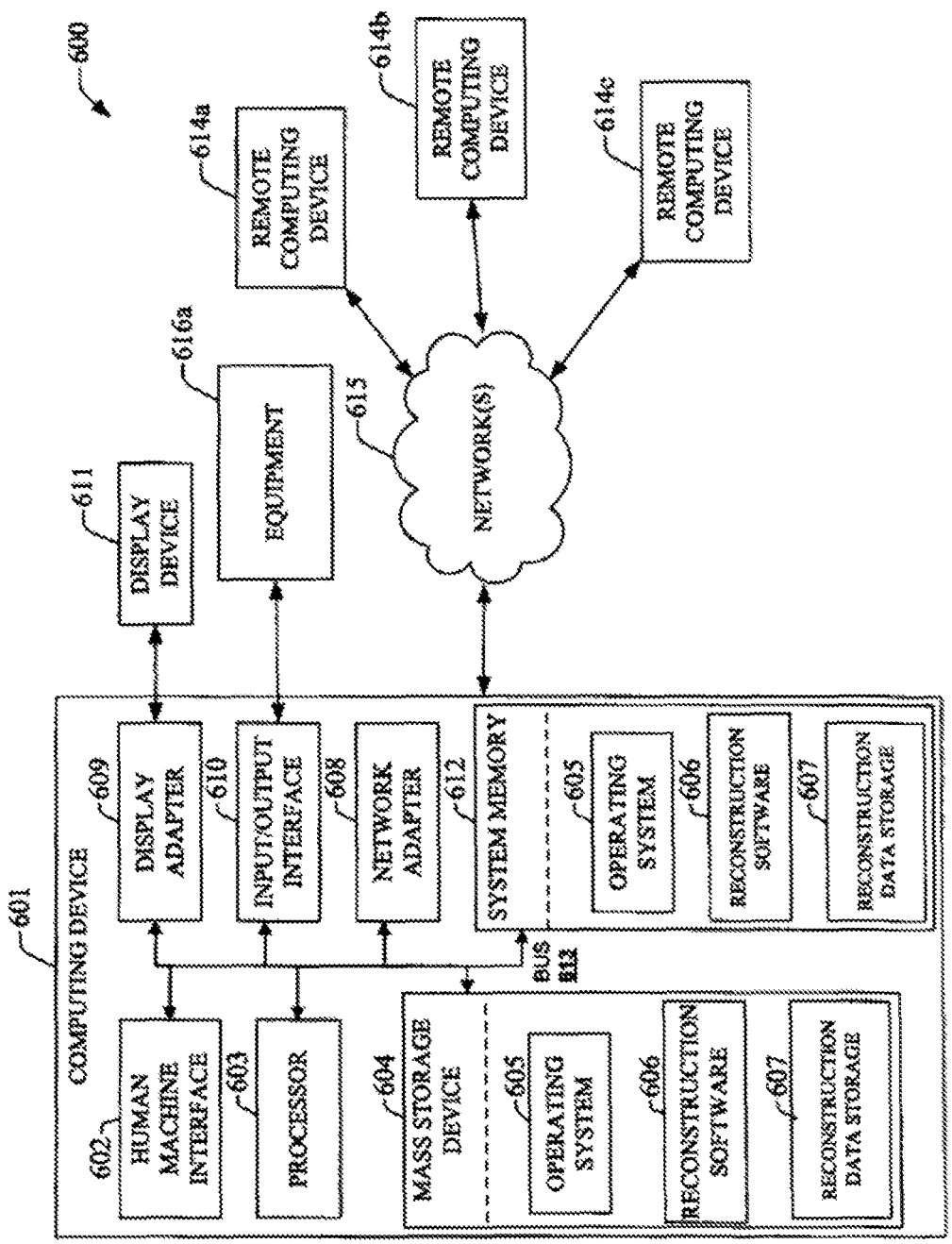
FIG. 2 illustrates a computing environment that enables one or more aspects of described herein.

FIG. 2 illustrates a block diagram of an exemplary operating environment 600 having a computing device 601 that enables various features of the disclosure and performance of the various methods disclosed herein. This exemplary operating environment 600 is only an example of an operating environment and is not intended to suggest any limitation as to the scope of use or functionality of operating environment architecture. Nor should the exemplary operating environment 600 be interpreted as having any dependency or requirement relating to any one or combination of functional elements (e.g., units, components, adapters, or the like) illustrated in such exemplary operating environment.

The various embodiments of the disclosure can be operational with numerous other general purpose or special purpose computing system environments or configurations. Examples of well known computing systems, environments, and/or configurations that can be suitable for use with the systems and methods of the disclosure comprise personal computers, server computers, laptop devices or handheld devices, and multiprocessor systems. Additional examples comprise mobile devices, programmable consumer electronics, network PCs, minicomputers, mainframe computers, distributed computing environments that comprise any of the above systems or devices, and the like.

The processing effected in the disclosed systems and methods can be performed by software components. In one aspect, the disclosed systems and methods can be described in the general context of computer-executable instructions, such as program modules, being executed by one or more computers, such as computing device 601, or other computing devices. Generally, program modules comprise computer code, routines, programs, objects, components, data structures, etc., that perform particular tasks or implement particular abstract data types. The disclosed methods also can be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 601. The components of the computer 601 can comprise, but are not limited to, one or more processors 603, or processing units 603, a system memory 612, and a system bus 613 that couples various system components including the processor 603 to the system memory 612. In the case of multiple processing units 603, the system can utilize parallel computing.

In general, a processor 603 or a processing unit 603 refers to any computing processing unit or processing device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally or alternatively, a processor 603 or processing unit 603 can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors or processing units referred to herein can exploit nano-scale architectures such as, molecular and quantum-dot based transistors, switches and gates, in order to optimize space usage or enhance performance of the computing devices that can implement the various aspects of the subject disclosure. Processor 603 or processing unit 603 also can be implemented as a combination of computing processing units.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this specification and annexed drawings also can be implemented over a wired or wireless network connection and each of the subsystems, including the processor 603, a mass storage device 604, an operating system 605, prior-image-based reconstruction software 606 (also referred to as reconstruction software 606), prior-image-based reconstruction data storage 607 (also referred to as reconstruction data storage 607), a network adapter 608, system memory 612, an Input/Output Interface 610, a display adapter 609, a display device 611, and a human machine interface 602, can be contained within one or more remote computing devices 614a,b,c at physically separate locations, functionally coupled (e.g., communicatively coupled) through buses of this form, in effect implementing a fully distributed system.

Reconstruction software 606 can configure the computing device 601, or a processor thereof, to perform the weighing of moving objects in accordance with aspects of the disclosure. Reconstruction software 606 can be retained in a memory as a group of computer-accessible instructions, e.g., computer-readable instructions, computer-executable instructions, or computer-readable computer-executable instructions. In one aspect, the group of computer-accessible instructions can encode the methods of the disclosure (such as the exemplary method illustrated in FIG. 3). In another aspect, the group of computer-accessible instructions can encode various formalisms (e.g., image segmentation) for computer vision tracking. Certain implementations of reconstruction software 606 can include a compiled instance of such computer-accessible instructions, a linked instance of such computer-accessible instructions, a compiled and linked instance of such computer-executable instructions, or an otherwise executable instance of the group of computer-accessible instructions. An implementation of reconstruction software 606 retained in a memory of the computing device 601 can embody a component that can assess prior-image-based reconstruction, wherein in response to execution of the implementation of the reconstruction software 606 by the processor 601, for example, implements one or more features described herein.

Reconstruction data storage 607 can comprise various types of data that can permit implementation (e.g., compilation, linking, execution, and combinations thereof) of the reconstruction software 606

The computing device 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data (such as a group of tokens employed for code buffers) and/or program modules such as operating system 605 and reconstruction software 606 that are immediately accessible to and/or are presently operated on by the processing unit 603. Operating system 605 can comprise OSs such as Windows operating system, Unix, Linux, Symbian, Android, iOS, Chromium, and substantially any operating system for wireless computing devices or tethered computing devices.

In another aspect, computing device 601 can comprise other removable/non-removable, volatile/non-volatile computer storage media. As illustrated, computing device 601 comprises a mass storage device 604 which can provide non-volatile storage of computer code (e.g., computer-executable instructions), computer-readable instructions, data structures, program modules, and other data for the computing device 601. For instance, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605, and reconstruction software 606. Each of the operating system 605 and reconstruction software 606 (or some combination thereof) can comprise elements of the programming and the reconstruction software 606. Data and code (e.g., computer-executable instruction(s)) can be retained as part of reconstruction software 606 and can be stored on the mass storage device 604. Reconstruction software 606, and related data and code, can be stored in any of one or more databases known in the art. Examples of such databases comprise, DB2®, Microsoft® Access, Microsoft® SQL Server, Oracle®, mySQL, PostgreSQL, and the like. Further examples include membase databases and flat file databases. The databases can be centralized or distributed across multiple systems.

In another aspect, a user can enter commands and information into the computing device 601 via an input device (not shown). Examples of such input devices comprise, but are not limited to, a camera; a keyboard; a pointing device (e.g., a "mouse"); a microphone; a joystick; a scanner (e.g., barcode scanner); a reader device such as a radiofrequency identification (RFID) readers or magnetic stripe readers; gesture-based input devices such as tactile input devices (e.g., touch screens, gloves and other body coverings or wearable devices), speech recognition devices, or natural interfaces; and the like. These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 also can be functionally coupled to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like.

As illustrated, equipment 616a can be functionally coupled to the system bus 613 through an I/O interface of the one or more I/O interface(s) 610. Through the functional coupling through such I/O interface, the one or more camera(s) can be functionally coupled to other functional elements of the computing device. Such frame grabber can be an analog frame grabber or a digital frame grabber, or a combination thereof. In case of an analog imaging equipment, processor 603 can provide analog-to-digital functionality and decoder functionality, and the I/O interface can include circuitry to collect the analog signal received from the equipment 616a. In one aspect, in response to execution by processor 603, reconstruction software 606 can operate the equipment 616a to receive imaging data in accordance with various aspects described herein.

The computing device 601 can operate in a networked environment (e.g., an industrial environment) using logical connections to one or more remote computing devices 614a,b,c, and equipment 616a. By way of example, a remote computing device can be a personal computer, portable computer, a mobile telephone, a server, a router, a network computer, a peer device or other common network node, and so on. Logical connections between the computer 601 and a remote computing device 614a,b,c can be made via a local area network (LAN) and a general wide area network (WAN). Such network connections can be implemented through a network adapter 608. A network adapter 608 can be implemented in both wired and wireless environments. Such networking environments can be conventional and commonplace in offices, enterprise-wide computer networks, intranets. The networking environments generally can be embodied in wireline networks or wireless networks (e.g., cellular networks, such as Third Generation (3G) and Fourth Generation (4G) cellular networks, facility-based networks (femtocell, picocell, Wi-Fi networks, etc.). A group of one or more network(s) 615 can provide such networking environments. In one scenario, the one or more network(s) can comprise a LAN deployed in an industrial environment comprising the exemplary system 100 described herein.

As an illustration, application programs and other executable program components such as the operating system 605 are illustrated herein as discrete blocks, although it is recognized that such programs and components reside at various times in different storage components of the computing device 601, and are executed by the data processor(s) of the computer. An implementation of reconstruction software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer-readable media can comprise "computer storage media," or "computer-readable storage media," and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 3:
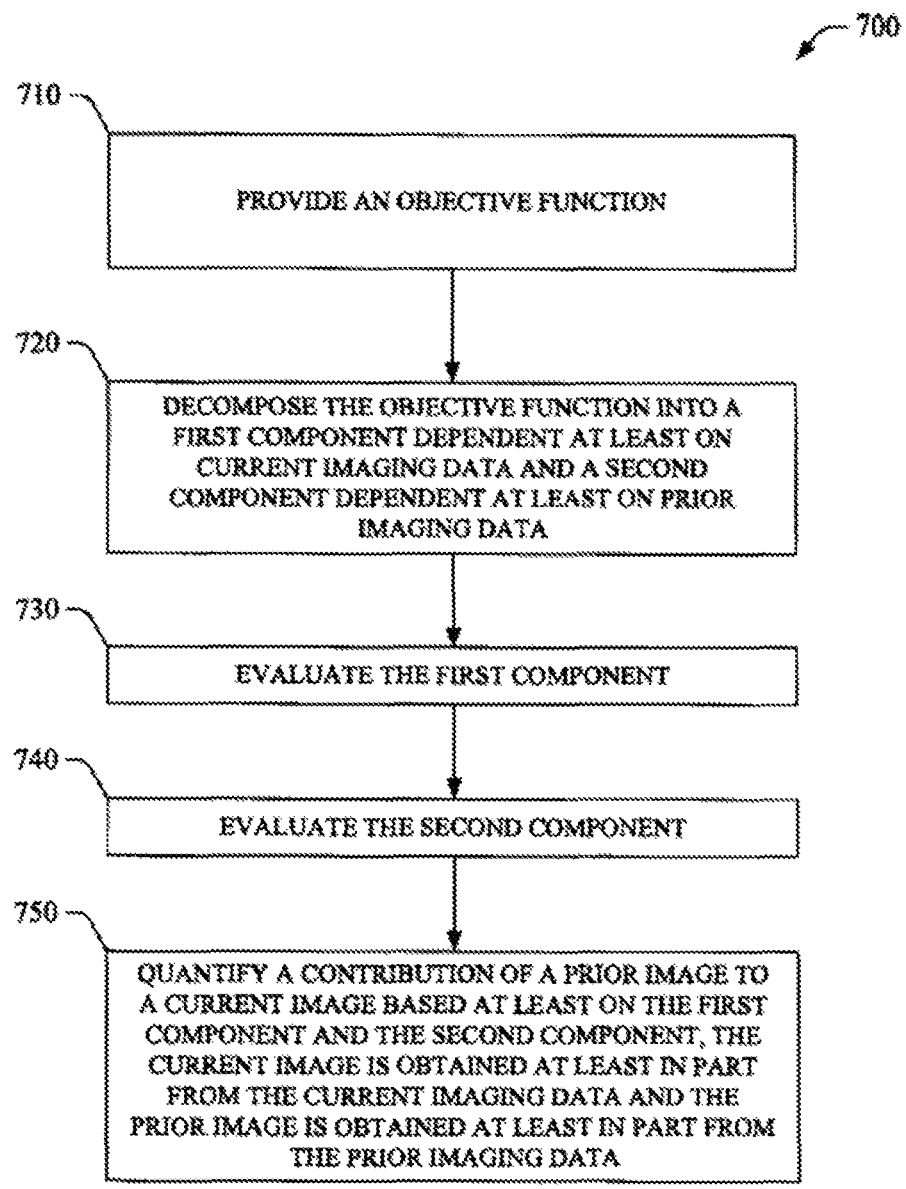
FIG. 3 illustrates an exemplary method in accordance with aspects of the subject disclosure.

In view of the aspects described hereinbefore, an exemplary method that can be implemented in accordance with the disclosed subject matter can be better appreciated with reference to the flowchart in FIG. 3. For purposes of simplicity of explanation, the exemplary method disclosed herein is presented and described as a series of acts; however, it is to be understood and appreciated that the claimed subject matter is not limited by the order of acts, as some acts may occur in different orders and/or concurrently with other acts from that shown and described herein. For example, the various methods or processes of the subject disclosure can alternatively be represented as a series of interrelated states or events, such as in a state diagram. Moreover, when disparate functional elements implement disparate portions of the methods or processes in the subject disclosure, an interaction diagram or a call flow can represent such methods or processes. Furthermore, not all illustrated acts may be required to implement a method in accordance with the subject disclosure. Further yet, two or more of the disclosed methods or processes can be implemented in combination with each other, to accomplish one or more features or advantages herein described. It should be further appreciated that the exemplary methods disclosed throughout the subject specification can be stored on an article of manufacture, or computer-readable medium, to facilitate transporting and transferring such methods to computers for execution, and thus implementation, by a processor or for storage in a memory.

FIG. 3 is a flowchart of an exemplary method for evaluating information propagation in prior-image-based reconstruction accordance with one or more aspects of the disclosure. In embodiment, a computing device or a processor included therein or functionally coupled thereto can implement (e.g., execute) the subject exemplary method 700. At block 710, an objective function is provided. In one aspect, the objective function can be the objective function of Eq. (4). At block 720, the objective function can be decomposed into a first component dependent at least on current imaging data and a second component dependent at least on prior imaging data. At block 730, the first component can be evaluated. At block 740 the second component can be evaluated. At block 750, the contribution of a prior image to a current image can be quantified based at least on the first component and the second component. In one aspect, the current image can be obtained at least in part from the current imaging data. In another aspect, the prior image can be obtained at least in part from the prior imaging data.

In various embodiments, the systems and methods of the subject disclosure can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the systems, devices, apparatuses, protocols, processes, and methods have been described in connection with exemplary embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the disclosure without departing from the scope or spirit of the subject disclosure. Other embodiments of the subject disclosure will be apparent from consideration of the specification and practice of the disclosure as disclosed herein. It is intended that the specification and examples be considered as non-limiting illustrations only, with a true scope and spirit of the subject disclosure being indicated by the following claims.

What is claimed is:

1. A method for evaluation of propagation of information in prior-image-based reconstruction, the method comprising:
    providing an objective function, wherein the objective function comprises a second term representing a generalized image penalty that discourages roughness in the reconstruction through use of one selected from a group consisting of a gradient applied to an image volume, a sparsifying operator applied to an image volume, a combination thereof, or a p-norm metric; and
    decomposing the objective function into a first component dependent at least on current imaging data and a second component dependent at least on prior imaging data.

2. The method of claim 1, wherein the decomposing step comprises approximating at least a portion of the objective function.

3. The method of claim 1, wherein the objective function comprises a first term representing a log-likelihood function enforcing a fit between an attenuation estimate and the current imaging data.

4. The method of claim 3, wherein the decomposing step comprises approximating the log-likelihood function.

5. The method of claim 3, wherein the first term incorporates the relative data fidelity of different measurements.

6. The method of claim 1, wherein the p-norm metric is a quadratic penalty.

7. The method of claim 1, wherein the objective function comprises a second term representing a generalized image penalty that discourages roughness in the reconstruction through a p-norm metric and use of a gradient applied to an image volume, a sparsifying operator applied to an image volume, or a combination thereof.

8. A system, comprising:
    a memory having computer-executable instructions encoded thereon; and
    a processor functionally coupled to the memory and configured, by the computer-executable instructions, to provide an objective function, wherein the objective function comprises a second term representing a generalized image penalty that discourages roughness in the reconstruction through use of one selected from a group consisting of a gradient applied to an image volume, a sparsifying operator applied to an image volume, a combination thereof, or a p-norm metric; and
    to decompose the objective function into a first component dependent at least on current imaging data and a second component dependent at least on prior imaging data.

9. The system of claim 8, wherein the decomposing step comprises approximating at least a portion of the objective function.

10. The system of claim 8, wherein the objective function comprises a first term representing a log-likelihood function enforcing a fit between an attenuation estimate and the current imaging data.

11. The system of claim 10, wherein the processor is further configured to generate an approximation of the log-likelihood function.

12. The system of claim 10, wherein the first term incorporates the relative data fidelity of different measurements.

13. The system of claim 8, wherein the p-norm metric is a quadratic penalty.

14. The system of claim 8, wherein the objective function comprises a second term representing a generalized image penalty that discourages roughness in the reconstruction through a p-norm metric and use of a gradient applied to an image volume.

15. The system of claim 8, wherein the objective function comprises a second term representing a generalized image penalty that discourages roughness in the reconstruction through a p-norm metric and use of a sparsifying operator applied to an image volume.

16. A method for quantification of propagation of information in prior-image-based reconstruction, the method comprising:
    providing an objective function, wherein the objective function comprises a second term representing a generalized image penalty that discourages roughness in the reconstruction through use of one selected from a group consisting of a gradient applied to an image volume, a sparsifying operator applied to an image volume, a combination thereof, or a p-norm metric;
    decomposing the objective function into a first component dependent at least on current imaging data and a second component dependent at least on prior imaging data;
    evaluating the first component;
    evaluating the second component; and
    quantifying a contribution of a prior image to a current image based at least on the first component and the second component, wherein the current image is obtained at least in part from the current imaging data, and wherein the prior image is obtained at least in part from the prior imaging data.

* * * * *